United States Patent [19]
Neumann

[11] Patent Number: 5,809,809
[45] Date of Patent: Sep. 22, 1998

[54] DRIVE DEVICE FOR A FRONT-LOADING WASHING MACHINE

[75] Inventor: Wolfgang Neumann, Berlin, Germany

[73] Assignee: BSH Bosch und Siemens Hausgeraete GmbH, Munich, Germany

[21] Appl. No.: 763,902

[22] Filed: Dec. 11, 1996

[30] Foreign Application Priority Data

Dec. 11, 1995 [DE] Germany ............... 195 46 185.1

[51] Int. Cl.⁶ .................................................. D06F 37/30
[52] U.S. Cl. ........................................................... 68/140
[58] Field of Search .................. 68/12.16, 24, 140

[56] References Cited

FOREIGN PATENT DOCUMENTS

| 1354594 | 1/1964 | France | 68/24 |
| 4157 | 7/1956 | Germany | 68/24 |
| 6411595 | 4/1965 | Netherlands | 68/140 |

*Primary Examiner*—Philip R. Coe
*Attorney, Agent, or Firm*—Herbert L. Lerner; Laurence A. Greenberg

[57] ABSTRACT

A front-loading washing machine has a laundry drum and a washing liquid container with a rear wall. A drive device for the washing machine includes a stiff carrier part mounted at the rear wall of the washing liquid container and having a bearing sleeve. An at least substantially horizontal shaft supports the laundry drum overhung in the bearing sleeve and has an end protruding out of the bearing sleeve toward the rear. A flat motor is mounted at the rear wall of the washing liquid container for directly driving the shaft. The flat motor has a stator connected to the stiff carrier part to form a disc-shaped chamber and has a rotor. A hub rotationally fixes the rotor to the end of the shaft. Rolling bearings rotatably connect the hub to the stiff carrier part or to the stator.

6 Claims, 2 Drawing Sheets

DRIVE DEVICE FOR A FRONT-LOADING WASHING MACHINE

BACKGROUND OF THE INVENTION

Field of the Invention

The invention relates to a drive device for a front-loading washing machine with a laundry drum which is supported overhung by an at least substantially horizontal shaft within a bearing sleeve of a stiff carrier part mounted at a rear wall of a washing liquid container and which is driven directly by a flat motor that is likewise mounted at the rear wall of the washing liquid container.

Such a drive device is known from German Published, Non-Prosecuted Patent Application DE 39 27 426 A1. In that device, a stator of the flat motor, which is constructed as a collectorless, external rotor, d.c. motor, is fastened directly on a bearing sleeve of the stiff carrier part. The shaft is supported in the bearing sleeve and its outer end is connected with the rotor of the flat motor so as to be secure against relative rotation. The rotor in that case is a so-called external rotor which engages over the stator windings like a pot and carries poles in the form of permanent magnets.

The known drive device is not deliverable as a pre-assembled motor to the washing machine manufacturing plant. Its stator and its rotor must be supplied separately and only assembled together in the washing machine plant. Since as a rule no special assembly equipment for the completion of motor assemblies is present in a washing machine plant and is also not desired, the completion of the stator assembly to be connected initially with the washing liquid container system by the external rotor assembly can only regularly take place in an inaccurate manner. Since extremely high demands are made on the maintenance of a small airgap which as far as possible is always of equal size for each product and is located between the stator windings and the rotor poles as well as on the centered bearing, and since such demands cannot be fulfilled in the case of the aforementioned assembly in a washing machine factory, the known drive device is practically unusable.

SUMMARY OF THE INVENTION

It is accordingly an object of the invention to provide a drive device for a front-loading washing machine, which overcomes the hereinafore-mentioned disadvantages of the heretofore-known devices of this general type, which can be assembled without risk of impermissible inaccuracies in the washing machine manufacturing plant and which can be mounted at a system as a sieve carrier part in place of a cast spider while the washing liquid container system remains largely unchanged.

With the foregoing and other objects in view there is provided, in accordance with the invention, in a front-loading washing machine having a laundry drum and a washing liquid container with a rear wall, a drive device, comprising a stiff carrier part mounted at the rear wall of the washing liquid container, the stiff carrier part having a bearing sleeve; an at least substantially horizontal shaft supporting the laundry drum overhung in the bearing sleeve, the shaft having an end protruding out of the bearing sleeve toward the rear; a flat motor mounted at the rear wall of the washing liquid container for directly driving the shaft, the flat motor having a stator connected to the stiff carrier part to form a disc-shaped chamber, and the flat motor having a rotor; a hub rotationally fixing the rotor to the end of the shaft; and rolling bearings rotatably connecting the hub to the stiff carrier part or to the stator.

In this manner, the motor can be assembled and tested completely in the manufacturing plant of the motor supplier. There, the assembly aids which are suitable therefor are available so that motor assemblies which are always equally accurately assembled can be supplied to the washing machine plant. In that case, the assembly can be mounted to the rear wall of the washing liquid container system in place of the cast carrying spider usually found at that location. For that purpose, the stator is fastened through the use of several screws in any desired locations of the rear wall of the washing liquid container. Then, the shaft of the laundry drum is inserted into the hub of the rotor, which is already connected with the stator by way of the rolling bearings, and secured by a central screw. Those process steps are extremely similar to those of the fastening of a carrying spider and a belt pulley according to the heretofore known washing machine structures, so that no completely different working steps have to be learned by the assembly personnel.

The drive device according to the invention advantageously replaces almost all otherwise conventional equipment of a washing machine drive. Those are a heretofore known motor mounted at the washing liquid container through the use of a special fastening device, a cast-iron carrying spider for the washing liquid container, rubber buffers between it and the washing liquid container, a belt pulley, a belt and a pinion.

In accordance with another feature of the invention, the stator is constructed in two shells including a rear cover shell with one part of the bearing sleeve as well as a front mounting shell with another part of the bearing sleeve, a plurality of stator windings are distributed uniformly within the disc-shaped chamber at an inner casing surface of an outer encircling flange of the front mounting shell and the disc-shaped chamber is closed from the rear by the cover shell which is repeatedly screwed together with the flange. In this way, the stator has a large diameter and many uniformly distributed, electronically commutable windings which permit an extremely great rotational speed spread for the rotor, that on one hand give it quiet running and on the other hand provide a very great torque at any rotational speed.

In accordance with a further feature of the invention, the outer casing surface of the flange of the front mounting shell has approximately uniformly distributed screw holes for connection with the washing liquid container, which leads to a connection of the motor with the washing liquid container that is completely similar to a carrying spider. Therefore, the washing liquid container need not undergo any change at that location.

In accordance with an added feature of the invention, the mounting shell has screw holes which are distributed over an imaginary circle around the bearing sleeve, for connection with parts of the washing liquid container, permitting a structure of the washing liquid container which agrees with that already present for an assembly with a carrying spider to be maintained at that location as well.

In accordance with a concomitant feature of the invention, when the cover shell is not already structured in such a way that it permits direct access to the screws along the imaginary circle, the rotor and the cover shell have assembly holes distributed over the imaginary circle around the bearing sleeve.

Other features which are considered as characteristic for the invention are set forth in the appended claims.

Although the invention is illustrated and described herein as embodied in a drive device for a front-loading washing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
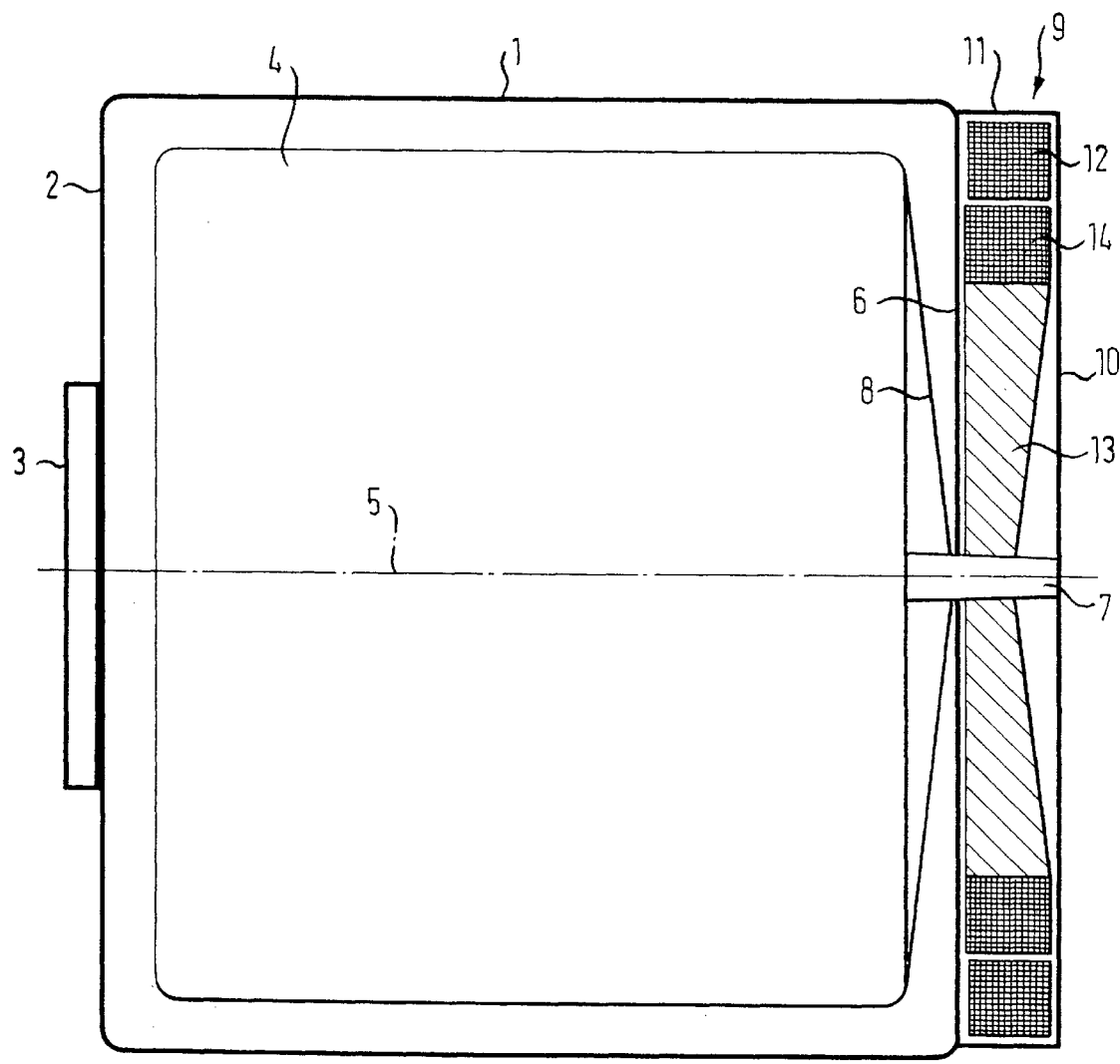
FIG. 1 is a diagrammatic, side-elevational view of a washing liquid container of a washing machine with a horizontally supported internal laundry drum having a drive shaft which is inserted into a rotor of a flat motor according to the invention.

Referring now to the figures of the drawings in detail and first, particularly, to FIG. 1 thereof, there is seen a washing liquid container 1 which is oscillatingly supported in a non-illustrated manner in a likewise non-illustrated housing of a washing machine. The washing liquid container 1 includes a front wall 2 having an opening 3 for the loading and unloading of a laundry drum 4, which is supported to be rotatable about a horizontal axis 5 in a rear wall 6 of the washing liquid container 1. In order to rotatably support the laundry drum 4, a shaft 7 is connected at a rear wall 8 of the laundry drum 4 so as to be rotationally secure therewith.

A flat motor 9 is mounted at the rear wall 6 of the washing liquid container 1 and has a stator housing 10 which is connected so as to be rotationally secure with the rear wall 6. Several stator windings 12 are uniformly distributed at an inner casing surface of a flange 11 of the stator housing 10 and during rotation of a rotor 13 they alternatingly correspond with poles 14, which can likewise be formed (although short-circuited in this case) of windings or of permanent magnets. The flat motor can thereby introduce driving moments directly by way of a journal of the shaft 7 to the laundry drum 4. In that case, the stator of the flat motor also takes up all bearing forces.

Figure 2:
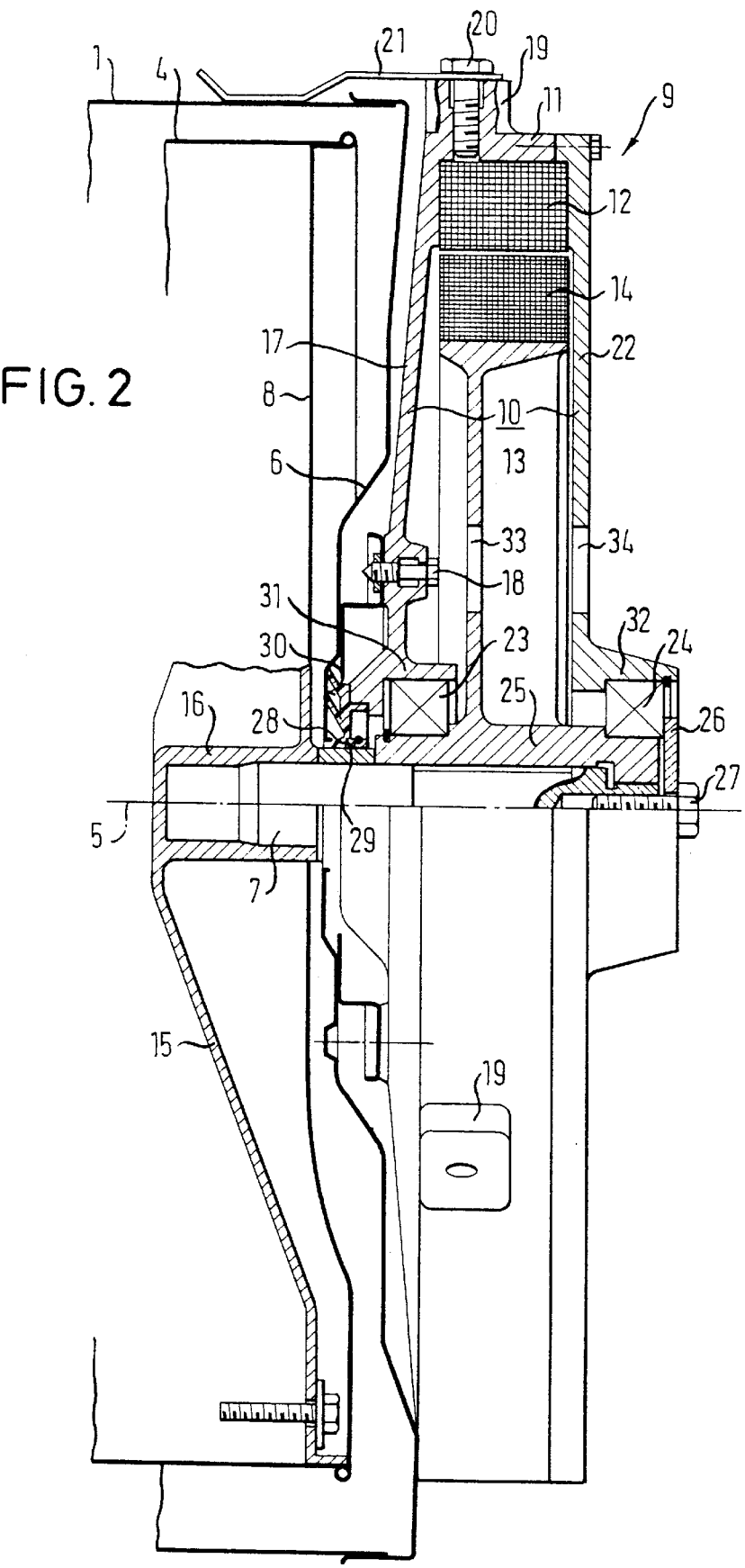
FIG. 2 is an enlarged, fragmentary, partly-sectional view of the flat motor which is mounted at a rear wall, according to FIG. 1.

According to FIG. 2, the rear wall 8 of the laundry drum 4 is stiffened by a carrying spider 15, having a hub 16 which is connected with the journal of the shaft 7 so as to be secure against relative rotation. A stiff carrier part in the form of a mounting shell 17 of the stator housing 10 has a bearing sleeve for the shaft 7 and is furthermore screwed on to the rear wall 6 of the washing liquid container 1 by captive screws 18 so as to be rotationally secure. The stator, flange and windings 10, 11, 12 of the flat motor are connected with the stiff carrier part 17 in such a way as to form a disc-shaped chamber. In order to ensure that a washing machine fitter in the washing machine manufacturing plant can mount the already completely assembled motor at the rear wall 6 of the washing liquid container 1, an equal number of access holes 33 and 34 is disposed in a disc of the rotor 13 and in a cover shell 22 along an imaginary circle of the distribution of the screws 18, in such a way that the holes 34 in the cover shell are also in alignment with the screws 18. Beyond that, an outer surface of the flange 11 of the stator housing 10 carries several, preferably three, fastening eyes 19, which are distributed around the circumference of the washing liquid container 1 and which provide a firm connection with the washing liquid container, through the use of screws 20 and additionally by way of straps 21 welded to the washing liquid container 1. The stator housing 10 is completed by the rearward cover shell 22, which is screwed at a uniform spacing to a rearward end surface of the flange 11.

Central bores in the mounting or assembly shell 17 and the cover shell 22 form bearing seats 31 and 32 for rolling bearings 23 and 24, having inner rings which are press-fitted on a hub 25 of the rotor 13. The bearing seats 31, 32 define the bearing sleeve for the shaft 7. The journal of the shaft 7 is inserted with a good fit into this hub 25 and secured at an outer end through the use of a pressure washer 26 and a central screw 27 against the inner ring of the rolling bearing 24, so as to be secure against rotation. In this case, a spacer ring 28, which is polished on its outer surface, is pressed-in between the hub 16 of the carrying spider 15 of the laundry drum 4 and the hub 25 of the rotor 13. A sealing ring 29 has sealing lips which are retained at the shaft side through the use of a spring ring on the polished outer surface of the spacer ring 28 and the sealing ring 29 is connected with a step of the central bore in the assembly shell 17. Sealing lips of the sealing ring 29 facing the rear wall 6 of the washing liquid container 1 are applied by axial pressure against a likewise polished annular surface 30 of a metal plate of the rear wall. Washing liquid attempting to get out of the washing liquid container is thereby prevented from emerging.

I claim:

1. In a front-loading washing machine having a laundry drum and a washing liquid container with a rear wall, a drive device, comprising:

a stiff carrier part mounted at the rear wall of the washing liquid container, said stiff carrier part having a bearing sleeve;

roller bearings disposed in said bearing sleeve;

an at least substantially horizontal shaft supporting the laundry drum overhung in said bearing sleeve, said shaft having an end protruding out of said bearing sleeve;

a flat motor mounted at the rear wall of the washing liquid container for directly driving said shaft, said flat motor having a stator connected to said stiff carrier part to form a disc-shaped chamber, and said flat motor having a rotor; and a hub torsionally fixing said rotor to said end of said shaft and engaging said roller bearings for supporting both of said rotor and said shaft against said roller bearings, and said rolling bearings rotatably connecting said hub to said stiff carrier part.

2. The drive device according to claim 1, wherein said rolling bearings rotatably connect said hub to said stator.

3. In a front-loading washing machine having a laundry drum and a washing liquid container with a rear wall, a drive device, comprising:

a front mounting shell defining a stiff carrier part mounted at the rear wall of the washing liquid container, said stiff carrier part having a bearing sleeve;

an at least substantially horizontal shaft supporting the laundry drum overhung in said bearing sleeve, said shaft having an end protruding out of said bearing sleeve;

a flat motor mounted at the rear wall of the washing liquid container for directly driving said shaft, said flat motor having a stator connected to said stiff carrier part to form a disc-shaped chamber, and said flat motor having a rotor;

said stator including a rear cover shell with one part of said bearing sleeve and said front mounting shell with another part of said bearing sleeve, said front mounting shell having an outer encircling flange with an inner casing surface;

a plurality of stator windings are distributed uniformly within said disc-shaped chamber at said inner casing surface;

said rear cover shell is repeatedly screwed together with said flange to close said disc-shaped chamber from the rear; and a hub torsionally fixing said rotor to said end of said shaft.

4. The drive device according to claim 3, wherein said flange of said front mounting shell has an outer casing surface with substantially uniformly distributed screw holes formed therein for connection to said washing liquid container.

5. The drive device according to claim 3, wherein said front mounting shell has screw holes formed therein distributed over an imaginary circle around said bearing sleeve, for connection with parts of said washing liquid container.

6. The drive device according to claim 5, wherein said rotor and said cover shell have access holes formed therein distributed over the imaginary circle around said bearing sleeve.

* * * * *